United States Patent
Bai et al.

(10) Patent No.: US 11,693,430 B2
(45) Date of Patent: Jul. 4, 2023

(54) GAIT PLANNING METHOD, COMPUTER-READABLE STORAGE MEDIUM AND ROBOT

(71) Applicant: UBTECH ROBOTICS CORP LTD, Shenzhen (CN)

(72) Inventors: Jie Bai, Shenzhen (CN); Ligang Ge, Shenzhen (CN); Yizhang Liu, Shenzhen (CN); Hongge Wang, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 324 days.

(21) Appl. No.: 17/114,526

(22) Filed: Dec. 8, 2020

(65) Prior Publication Data
US 2021/0181765 A1   Jun. 17, 2021

(30) Foreign Application Priority Data
Dec. 11, 2019  (CN) .......................... 201911266430.7

(51) Int. Cl.
G05D 1/02 (2020.01)
G05D 1/08 (2006.01)
B62D 57/02 (2006.01)
G05B 19/4155 (2006.01)

(52) U.S. Cl.
CPC ............ *G05D 1/0891* (2013.01); *B62D 57/02* (2013.01); *G05B 19/4155* (2013.01); *G05D 1/0212* (2013.01); *G05B 2219/40233* (2013.01)

(58) Field of Classification Search
CPC ... B25J 9/1664; G05D 1/0212; G05D 1/0891; G05B 19/4155; G05B 2219/40264; G05B 2219/40233; B62D 57/032; B62D 57/02
See application file for complete search history.

(56) References Cited

U.S. PATENT DOCUMENTS

| | | | |
|---|---|---|---|
| 2003/0114960 A1* | 6/2003 | Takenaka | B62D 57/024 700/247 |
| 2004/0107780 A1* | 6/2004 | Kawai | B62D 57/032 73/862.08 |
| 2006/0149420 A1* | 7/2006 | Ikeuchi | B62D 57/032 700/245 |
| 2006/0197485 A1* | 9/2006 | Kawai | B62D 57/032 318/568.12 |
| 2010/0114329 A1* | 5/2010 | Easier | B62D 57/032 623/24 |
| 2010/0126785 A1* | 5/2010 | Shimada | B62D 57/032 180/8.1 |
| 2019/0204848 A1* | 7/2019 | Xiong | B25J 17/00 |

* cited by examiner

*Primary Examiner* — Stephen Holwerda

(57) ABSTRACT

A computer-implemented gait planning method includes: determining a pitch angle between a foot of the robot and a support surface where the robot stands; determining a support point on a sole of the foot according to the pitch angle; calculating an ankle-foot position vector according to the support point, wherein the ankle-foot position vector is a position vector from an ankle of the robot to a support point on a sole of the foot; calculating a magnitude of change of an ankle position according to the pitch angle and the ankle-foot position vector; and obtaining a compensated ankle position by compensating the ankle position according to the magnitude of change of the ankle position.

20 Claims, 10 Drawing Sheets

GAIT PLANNING METHOD, COMPUTER-READABLE STORAGE MEDIUM AND ROBOT

CROSS REFERENCE TO RELATED APPLICATIONS

This application claims priority to Chinese Patent Application No. CN201911266430.7, filed Dec. 11, 2019, which is hereby incorporated by reference herein as if set forth in its entirety.

BACKGROUND

1. Technical Field

The present disclosure generally relates to biped robots, and particularly to a gait planning method for controlling a biped robot.

2. Description of Related Art

One conventional gait planning method for a biped robot is as follows: Solving the inverse kinematics without considering the influence of a pitch angle between the sole of a foot of the robot and the support surface (i.e., floor or ground) when the robot walks, converting the planned motion trajectory into desired joint angles, and realizing a trajectory tracking by joint servo drive control. This method fails to fully consider the positive effects of changes in the pitch angle during bipedal walking, resulting in low motion efficiency. Additionally, swinging legs may have a jitter problem caused by drastic changes in the ankle position during walking of the robot, resulting in poor balance of the robot.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
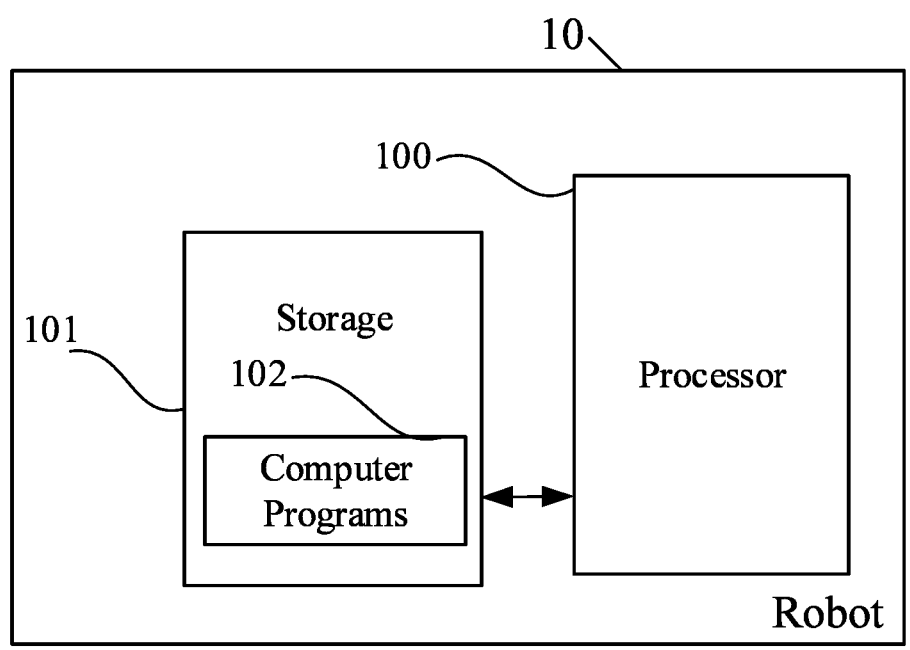
FIG. 1 is a schematic block diagram of a biped robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 10:
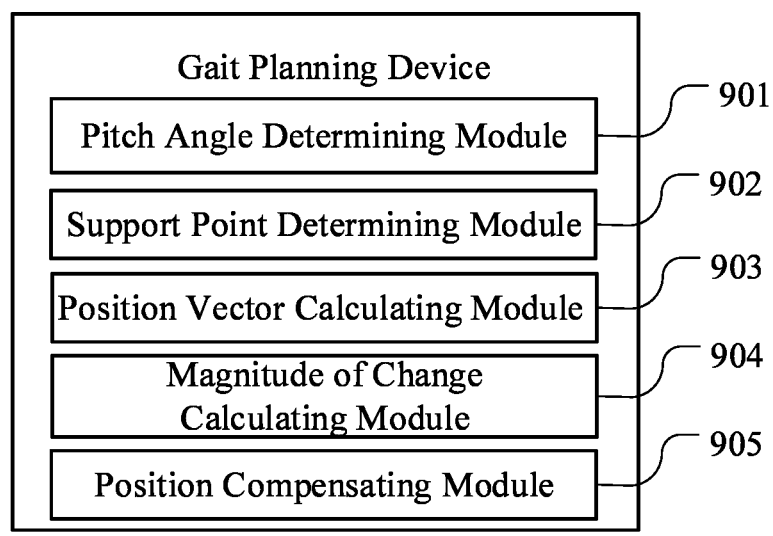
FIG. 10 is a schematic block diagram of a gait planning device according to one embodiment.

FIG. 1 is a schematic block diagram of a robot 10 according to one embodiment. The robot 10 may be a biped robot. The robot 10 includes a processor 100, a storage 101, one or more computer programs 102 stored in the storage 101 and executable by the processor 100. When the processor 100 executes the computer programs 102, the steps in the embodiments of the method for controlling the robot 10, such as steps S101 through S105 in FIG. 2, steps S1011 to S1013 in FIG. 3, and functions of modules/units in the embodiments, such as units 901 through 905 in FIG. 10, are implemented.

Exemplarily, the one or more computer programs 102 may be divided into one or more modules/units, and the one or more modules/units are stored in the storage 101 and executed by the processor 100. The one or more modules/units may be a series of computer program instruction segments capable of performing specific functions, and the instruction segments are used to describe the execution process of the one or more computer programs 102 in the robot 10. For example, the one or more computer programs 102 may be divided into a pitch angle determining module, a support point determining module, a position vector calculating module, a magnitude of change calculating module, and a position compensating module. The specific functions of each module are as follows:

The pitch angle determining module is configured to determine a pitch angle between a foot of the robot 10 and a support surface (e.g., floor or ground) where the robot 10 stands. The support point determining module is configured to determine a support point on a sole of the foot according to the pitch angle. The position vector calculating module is configured to calculate an ankle-foot position vector according to the support point. The ankle-foot position vector is a position vector from an ankle of the robot to the support point. The magnitude of change calculating module is configured to calculate a magnitude of change of an ankle position according to the pitch angle and the ankle-foot position vector. The position compensating module is configured to obtain a compensated ankle position by compensating the ankle position according to the magnitude of change of the ankle position.

It should be noted that FIG. 1 is merely an example of the robot 10, and does not limit the robot 10. The robot 10 may include components different in numbers from those illustrated, or incorporate some other different components. For example, the robot 10 may further include an input and output device, a network access device, a bus, and the like.

The processor 100 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 101 may be an internal storage unit of the robot 10, such as a hard disk or a memory. The storage 101 may also be an external storage device of the robot 10, such as a plug-in hard disk, a smart memory card (SMC), and a secure digital (SD) card, or any suitable flash cards. Furthermore, the storage 101 may also include both an internal storage unit and an external storage device. The storage 101 is used to store computer programs, other programs, and data required by the robot. The storage 101 can also be used to temporarily store data that have been output or is about to be output.

Figure 2:
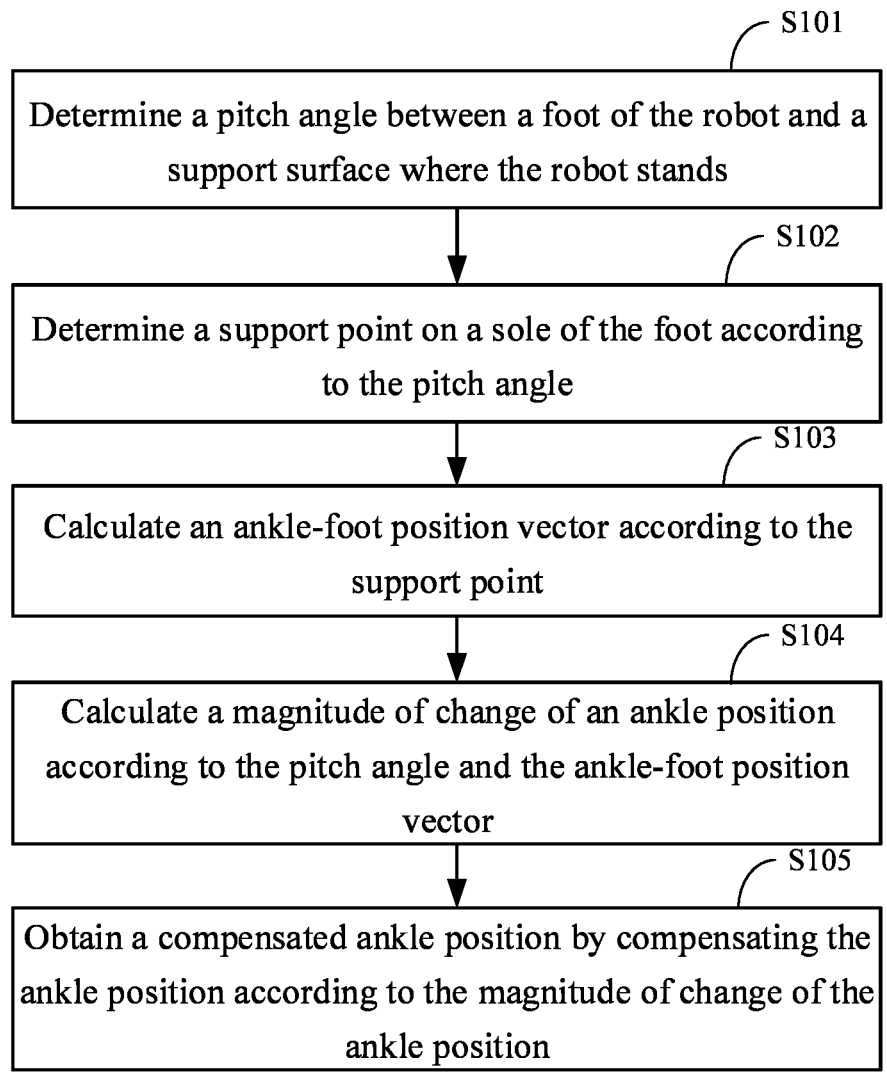
FIG. 2 is a schematic flowchart of a gait planning method according to one embodiment.

FIG. 2 shows a flowchart of a gait planning method that may include the following steps.

Figure 3:
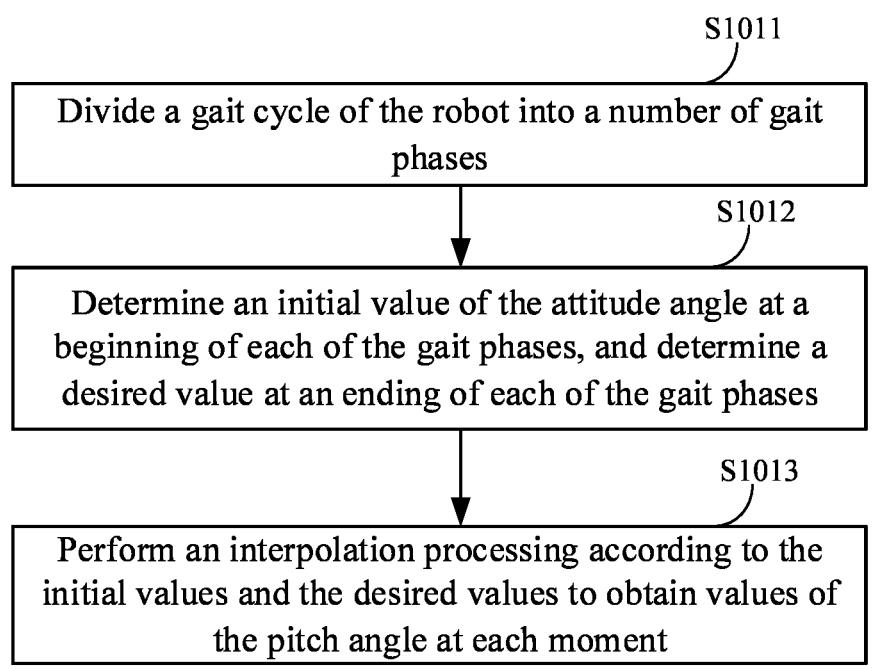
FIG. 3 is a schematic flowchart of method for determining a pitch angle of a foot of the robot of FIG. 1.

Step S101: Determine a pitch angle between a foot of the robot 10 and a support surface where the robot 10 stands. In one embodiment, as shown in FIG. 3, step S101 may include the following steps.

Step S1011: Divide a gait cycle of the robot 10 into a number of gait phases.

Figure 4:
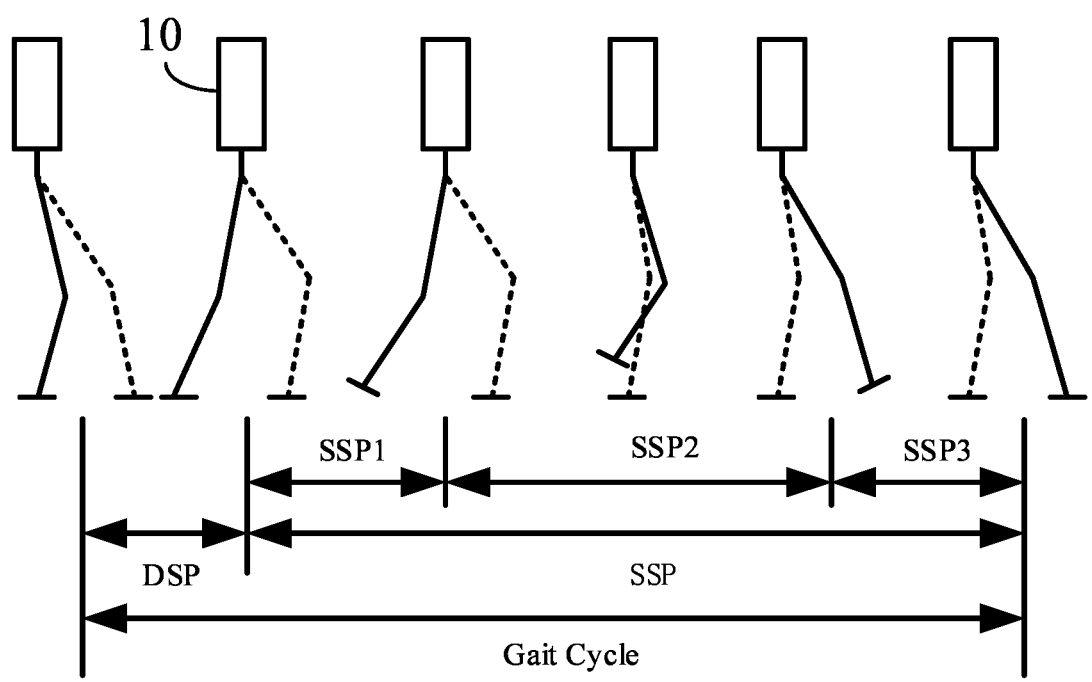
FIG. 4 is a schematic diagram showing a gait cycle of the robot.

Descriptions are now made by taking FIG. 4 as an example where the right leg (shown by the dotted lines in FIG. 4) as a supporting leg and the left leg (shown by the solid lines in FIG. 4) as a swing leg. In the example, one gait cycle of the biped robot 10 can be divided into a single support phase (SSP) and double support phase (DSP). The feet of the robot 10 will alternate between these two phases during walking of the robot 10. Considering that there is a change in the pitch angle during the single support phase, the single support phase may further be divided into a pre-swing phase, a mid-swing phase and a terminal swing phase. The situation where the left leg is the support leg and the right leg is the swing leg is similar to those described above, and will not be repeated here. In one embodiment, the pitch angle above is an angle between the sole of the foot and the support surface where the robot 10 stands.

Step S1012: Determine an initial value of the pitch angle at a beginning of each of the gait phases, and determine a desired value at an ending of each of the gait phases.

In the pre-swing phase as shown in FIG. 4, the ankle of the swing leg rotates about the toe of the left foot, causing the pitch angle to gradually increase from zero to a maximum value. After the toe lifts off the support surface, the mid-swing phase starts. The initial value at the beginning of the pre-swing phase is zero, and the desired value at the ending of the pre-swing phase is equal to the maximum value.

In the mid-swing phase as shown in FIG. 4, the left foot is in the air and the pitch angle gradually decreases from the maximum value to a preset minimum value. After the heel of the left foot comes into contact with the support surface, the terminal swing phase starts. The initial value at the beginning of the mid-swing phase can be set to the maximum value, and the desired value can be set to the minimum value.

In the terminal swing phase as shown in FIG. 4, the ankle of the swing leg rotates about the heel of the left foot, causing the pitch angle to gradually decrease from the minimum value to zero. After that, the double support phase starts. The initial value at the beginning of the terminal swing phase can be set to the minimum value, and the desired value can be set to zero.

Step S1013: Perform an interpolation processing according to the initial values and the desired values to obtain values of the pitch angle at each moment.

The introduction of the pitch angle when a foot lifts off and comes into contact with the support surface helps increase the leg length. In order not to affect the balance when the foot of the swing leg comes into contact with or lifts off the support surface, an interpolation algorithm can be used to determine a smooth motion curve that transitions from the initial values to the desired values in the planning process of the pitch angle. The motion curve includes, but is not limited to, cubic polynomial curve, S-curve, cubic spline curve, cubic Hermite curve, Bezier curve, and the like.

Taking the cubic polynomial curve as an example, the motion curve can be expressed at follows: $f(x_0,x_1,v_0,v_1,t_f,t)=a_0+a_1t+a_2t^2+a_3t^3$, where $x_0$ represents the initial value, $x_1$ represent the desired value, $v_0$ represents an initial speed corresponding to the initial value, $v_1$ represents a desired speed corresponding to the desired value, t represents time, $t_f$ represents the ending time corresponding to the desired value, $a_0$, $a_1$, $a_2$, $a_3$ represent coefficients of the cubic polynomial. In one embodiment, $v_0$ and $v_1$ can be set to zero. $a_0$, $a_1$, $a_2$, $a_3$ can be calculated according to the following equations: $a_0=x_0$; $a_1=v_1$;

$$a_2 = \frac{3}{t_f^2}(x_1 - x_0) - \frac{2}{t_f}v_0 - \frac{1}{t_f}v_1;$$

and $$a_3 = -\frac{2}{t_f^3}(x_1 - x_0) + \frac{1}{t_f}(v_0 + v_1).$$

Figure 5:
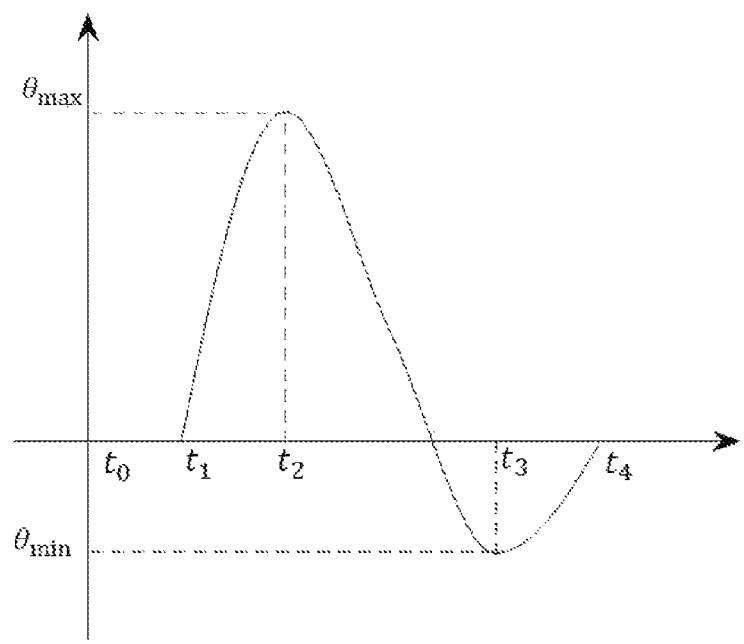
FIG. 5 is a diagram showing the values of the pitch angle at different time points in a gait cycle after interpolation processing.

FIG. 5 shows the values of the pitch angle at different time points in a gait cycle after interpolation processing. Specifically, in the double support phase from $t_0$ to $t_1$, $\theta=0$; in the pre-swing phase from $t_1$ to $t_2$, $\theta=f(0,\theta_{max},0,0,t_2-t_1,t)$; in the mid-swing phase from $t_2$ to $t_3$, $\theta=f(\theta_{max},\theta_{min},0,0,t_3-t_2,t)$; in the terminal swing phase from $t_3$ to $t_4$, $\theta=f(\theta_{min},0,0,0,t_4-t_3,t)$; where $t_0$ represents the moment when the double support phase starts, $t_1$ represents the moment when the double support phase terminates and the pre-swing phase starts, $t_2$ represents the moment when the pre-swing phase terminates and the mid-swing phase starts, $t_3$ represents the moment when the mid-swing phase terminates and the terminal swing phase starts, $t_4$ represents the moment when the terminal swing phase terminates, $\theta_{max}$ represents the maximum value, $\theta_{min}$ represents the minimum value, and $\theta$ represents the pitch angle.

Step S102: Determine a support point on a sole of the foot according to the pitch angle.

Step S103: Calculate an ankle-foot position vector according to the support point, wherein the ankle-foot position vector is a position vector from an ankle of the robot to the support point.

Figure 6:
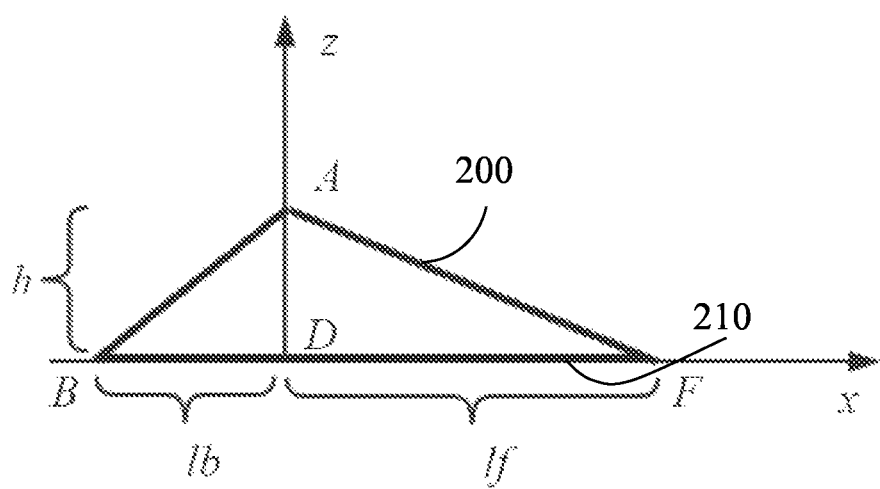
FIG. 6 shows a schematic configuration of one foot of the robot.

FIG. 6 shows a schematic diagram of one foot 200 of the robot 10. In the schematic configuration as shown in FIG. 6, point A represents the ankle of the foot 200, point D represents the projection of the ankle on the support surface, point F represents the toe of the foot 200, point B represents the heel of the foot 200, AD represents the height of the ankle relative to the support surface and is equal to h, FD represents a distance between the support point and the toe of the foot 200 and is equal to lf (i.e., the length of the front haft of the foot 200), and BD represents a distance between the support point and the heel of the foot 200 and is equal to lb (i.e., the length of the rear half of the foot 200). Reference numeral 210 denotes the sole of the foot 200, and θ represents the pitch angle between the sole 210 and the support surface where the robot 10 stands.

Figure 7:
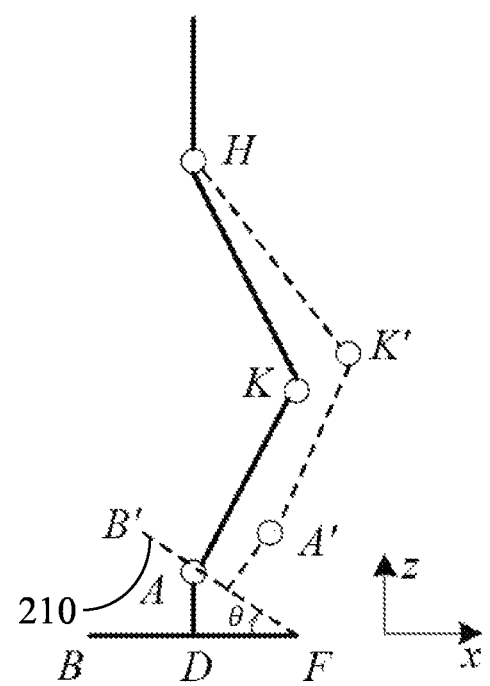
FIG. 7 shows the change of the ankle position caused by the change of the pitch angle in a pre-swing phase.

FIG. 7 shows the change of the ankle position caused by the change of the pitch angle in the pre-swing phase. Specifically, in FIG. 7, point H represents a hip joint, points K and K' respectively represent the positions of the knee joint before and after the change of the pitch angle, points A and A' represent the positions of the ankle joint before and after the change of the pitch angle, points B and B' represent the positions of the heel before and after the change of the pitch angle. The change of the ankle position caused by the change of the pitch angle in the mid-swing phase and in the terminal swing phase is similar to those described above. It should be noted that the pitch angle being positive or negative will cause change of the position of the support point.

In one embodiment, set point D as the origin O of a coordinate system, set a horizontal imaginary line passing through the point D as a first coordinate axis (referred to as "x-axis"), and set a vertical imaginary line passing through the point D as a second coordinate axis (referred to as "z-axis"). The direction pointing away from the support surface is the positive direction of the z-axis, and the walking direction of the robot 10 is the positive direction of the x-axis. In the coordinate system x0z, the ankle-foot position vector is expressed as $(ll, hh)^T$, where ll represents a component of the ankle-foot position vector on the first coordinate axis, and hh represents the component of the ankle-foot position vector on the second coordinate axis. In one embodiment, the component hh of the ankle-foot position vector on the preset second coordinate axis is set as the ankle height (i.e., hh=h).

When the pitch angle is greater than zero, the toe of the foot serves as the support point; and the component ll of the ankle-foot position vector on the preset first coordinate axis is set as a length of a front half of the foot (i.e., ll=lf).

When the pitch angle is equal to zero, the projection of the ankle on the support surface serves as the support point, and the component ll of the ankle-foot position vector on the preset first coordinate axis is set to zero (i.e., ll=0).

When the pitch angle is less than zero, the heel of the foot serves as the support point and the component ll of the ankle-foot position vector on the preset first coordinate axis is set as a length of a rear half of the foot (i.e., ll=−lb).

Step S104: Calculate a magnitude of change of an ankle position according to the pitch angle and the ankle-foot position vector.

In one embodiment, the magnitude of change of the ankle position can be calculated according to the formula as follows:

$$d_{ankle} = \begin{bmatrix} d_{ankle\_x} \\ d_{ankle\_z} \end{bmatrix} = g(\theta) = (I\ R) * (ll, hh)^T,$$

where I is a unit matrix and $$I = \begin{bmatrix} 1 & 0 \\ 0 & 1 \end{bmatrix},$$

R is a rotation matrix and $$R = \begin{bmatrix} \cos\theta & \sin\theta \\ -\sin\theta & \cos\theta \end{bmatrix},$$

and $d_{ankle}$ represents the magnitude of change of the ankle position.

Figure 8:
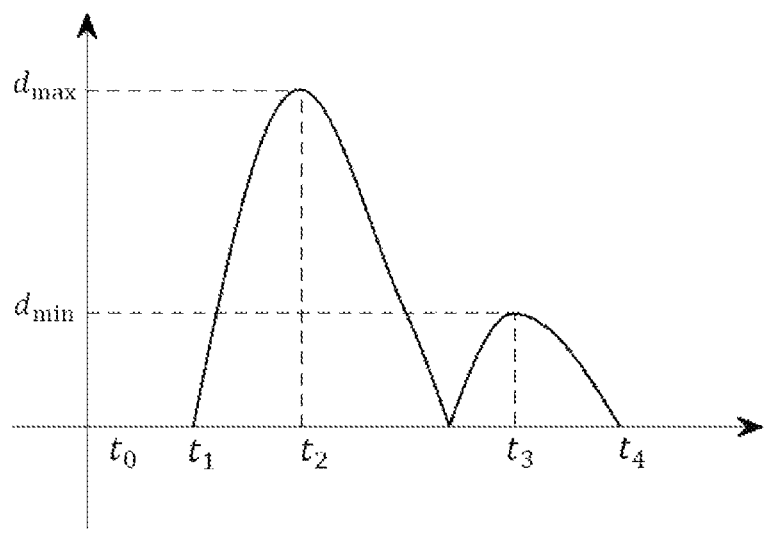
FIG. 8 shows values of the magnitude of change of an ankle position at different time points in a gait cycle.

FIG. 8 shows the values of the magnitude of change of the ankle position at different time points in a gait cycle. The figure shows the component of magnitude of change of the ankle position on the z-axis. Thus, FIG. 8 shows curve diagram of $d_{ankle\_z}$. The component of magnitude of change of the ankle position on the x-axis is similar to what is shown in FIG. 8 and will not be repeated. A first magnitude of change (referred to as "$d_{max}$") and a second magnitude of change (referred to as "$d_{min}$") can be determined from FIG. 8. The first magnitude of change corresponds to the magnitude of change of the ankle position when the pitch angle is equal to the maximum value, and the second magnitude of change corresponds to the magnitude of change of the ankle position when the pitch angle is equal to the maximum value.

Figure 9:
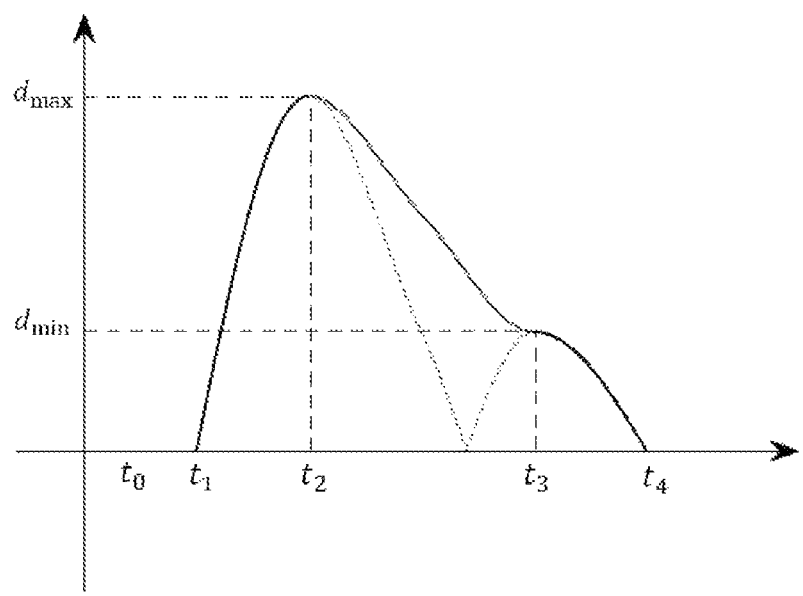
FIG. 9 shows values of corrected magnitude of change of the ankle position at different time points in a gait cycle.

It can be seen from FIG. 8 that the ankle position changes drastically when the swinging leg is in the mid-swing phase. In order to reduce the shaking of the swinging leg and increase the stability of robot 10 in the single support phase, the magnitude of change of the ankle position can be corrected according to the first magnitude of change and the second magnitude of change in the mid-swing phase, thereby obtaining a corrected magnitude of change of the ankle position. Specifically, in the mid-swing phase, the magnitude of change of the ankle position is not calculated according to the formula $d_{ankle}=g(\theta)$, and an interpolation algorithm may be used to calculate the magnitude of change of the ankle position (including components on the x-axis and the z-axis). That is, the magnitude of change of the ankle position can be calculated according a formula as follows:

$$d_{ankle} = \begin{cases} g(\theta), & SSP1\ \text{and}\ SSP3 \\ f(d_{max}, d_{min}, 0, 0, t_3 - t_2, t), & SSP2 \end{cases},$$

where SSP1 represents the pre-swing phase, SSP2 represents the mid-swing phase, and SSP3 represents the terminal swing phase. FIG. 9 shows the component of the corrected magnitude of change of the ankle position on the z-axis, that is, the schematic diagram of the curve of $d_{ankle\_z}$. The component of magnitude of change of the ankle position on the x-axis is similar to what is shown in FIG. 9 and will not be repeated.

Step S105: Obtain a compensated ankle position by compensating the ankle position according to the magnitude of change of the ankle position.

Specifically, compensated ankle position can be calculated according to a formula as follows: p_ankle_new=p_ankle_old+$d_{ankle}$, where p_ankle_old represents the ankle position, $d_{ankle}$ represents the magnitude of change of the ankle position, and p_ankle_new represents the compensated ankle position. It should be noted that the change of the pitch angle of the foot does not affect the ankle position in the y-axis direction, and only its influence to the ankle position in the x-axis and z-axis directions is considered.

With the method as described above, the length of legs of the robot 10 is increased by considering the change of the pitch angle of the foot (i.e., rotation of the foot), which is conducive to improving the motion efficiency of the biped robot in complex motions, fast walking, etc. In addition, shaking of the swinging leg due to the sharp change of the ankle position during the walking of the robot can be avoided, which can improve the balance of the biped robot.

FIG. 10 shows a schematic block diagram of a gait planning device according to one embodiment. The gait planning device may include a pitch angle determining module 901, a support point determining module 902, a position vector calculating module 903, a magnitude of change calculating module 904, and a position compensating module 905. The pitch angle determining module 901 is configured to determine a pitch angle between a foot of the robot 10 and a support surface (e.g., floor or ground) where the robot 10 stands. The support point determining module 902 is configured to determine a support point on a sole of the foot according to the pitch angle. The position vector calculating module 903 is configured to calculate an ankle-foot position vector according to the support point. The ankle-foot position vector is a position vector from an ankle of the robot to the support point. The magnitude of change calculating module 904 is configured to calculate a magnitude of change of an ankle position according to the pitch angle and the ankle-foot position vector. The position compensating module 905 is configured to obtain a compensated ankle position by compensating the ankle position according to the magnitude of change of the ankle position.

In one embodiment, the pitch angle determining module 901 may include a gait phase dividing unit, a value determining unit, and an interpolation processing unit. The gait phase dividing unit is configured to divide a gait cycle of the robot into a plurality of gait phases. The value determining unit is configured to determine an initial value of the pitch angle at a beginning of each of the gait phases, and determine a desired value at an ending of each of the gait phases. The interpolation processing unit is configured to perform an interpolation processing according to the initial values and the desired values to obtain values of the pitch angle at each moment.

In one embodiment, the value determining unit may include a first setting sub-module, a second setting sub-module, and a third setting sub-module. The first setting sub-module is configured to set the initial value of the pitch angle at a beginning of a pre-swing phase to zero, and set the desired value at an ending of the pre-swing phase to a preset maximum value. The second setting sub-module is configured to set the initial value of the pitch angle at a beginning of a mid-swing phase to the maximum value, and set the desired value at an ending of the mid-swing phase to a preset minimum value. The third setting sub-module is configured to set the initial value of the pitch angle at a beginning of a terminal swing phase to the minimum value, and set the desired value at an ending of the terminal swing phase to zero.

The position vector calculating module 903 may include a first calculating unit, a second calculating unit, a third calculating unit, and a fourth calculating unit. The first calculating unit is configured to set the component hh of the ankle-foot position vector on the preset second coordinate axis as an ankle height of the biped robot. The second calculating unit is configured to set the component ll of the ankle-foot position vector on the preset first coordinate axis as the length of the front half of the foot when the pitch angle is greater than zero, with a toe of the foot serving as the support point. The third calculating unit is configured to set the component ll of the ankle-foot position vector on the preset first coordinate axis to zero when the pitch angle is equal to zero, with a projection of the ankle on the support surface serving as the support point. The fourth calculating unit is configured to set the component ll of the ankle-foot position vector on the preset first coordinate axis as the length of a rear half of the foot when the pitch angle is less than zero, with a heel of the foot serving as the support point.

The magnitude of change calculating module 903 is configure to calculate the magnitude of change of the ankle position according to a formula as follows: $d_{ankle}=(I-R)*(ll, hh)^T$, where I is a unit matrix and $$I = \begin{bmatrix} 1 & 0 \\ 0 & 1 \end{bmatrix},$$

R is a rotation matrix and $$R = \begin{bmatrix} \cos\theta & \sin\theta \\ -\sin\theta & \cos\theta \end{bmatrix},$$

$\theta$ represents the pitch angle, $(ll, hh)^T$ represents the ankle-foot position vector, and $d_{ankle}$ represents the magnitude of change of the ankle position.

In one embodiment, the gait planning device may further include an extreme value determining module and a correcting module. The extreme value determining module is configured to determine a first magnitude of change corresponding to the magnitude of change of the ankle position when the pitch angle is equal to the maximum value, and determine a second magnitude of change corresponding to the magnitude of change of the ankle position when the pitch angle is equal to the maximum value. The correcting module is configured to correct the magnitude of change of the ankle position according to the first magnitude of change and the second magnitude of change in the mid-swing phase to obtain a corrected magnitude of change of the ankle position.

In one embodiment, position compensating module 904 can calculate the compensated ankle position according to a formula as follows: p_ankle_new=p_ankle_old+$d_{ankle}$, where p_ankle_old represents the ankle position, $d_{ankle}$ represents the magnitude of change of the ankle position, and p_ankle_new represents the compensated ankle position.

Those skilled in the art can clearly understand that, for the convenience and conciseness of the description, the specific working processes of the devices, modules and units described above can refer to the corresponding processes in the foregoing method embodiments, which will not be repeated here.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented gait planning method, comprising:
   providing a biped robot comprising a processor and two feet, wherein each of the two feet has a sole and an ankle;
   determining, by the processor, a pitch angle between the each of the two feet and a support surface where the biped robot stands;
   determining, by the processor, a support point on the sole of the each of the two feet according to the pitch angle;
   calculating, by the processor, an ankle-foot position vector according to the support point, wherein the ankle-foot position vector is a position vector from the ankle to the corresponding support point;
   calculating, by the processor, a magnitude of change of an ankle position according to the pitch angle and the ankle-foot position vector;
   obtaining, by the processor, a compensated ankle position by compensating the ankle position according to the magnitude of change of the ankle position; and
   controlling, by the processor, the biped robot to move according to the compensated ankle position.

2. The method according to claim 1, wherein determining, by the processor, the pitch angle comprises:
   dividing, by the processor, a gait cycle of the biped robot into a plurality of gait phases;

determining, by the processor, an initial value of the pitch angle at a beginning of each of the gait phases, and determining a desired value at an ending of each of the gait phases; and performing, by the processor, an interpolation processing according to the initial values and the desired values to obtain values of the pitch angle at each moment, wherein an interpolation algorithm is used to determine a smooth motion curve in a planning process of the pitch angle, and the smooth motion curve transitions from the initial values to the desired values.

3. The method according to claim 2, wherein determining, by the processor, the initial values and the desired values comprises:

setting, by the processor, the initial value of the pitch angle at a beginning of a pre-swing phase to zero, and setting the desired value at an ending of the pre-swing phase to a preset maximum value;

setting, by the processor, the initial value of the pitch angle at a beginning of a mid-swing phase to the maximum value, and setting the desired value at an ending of the mid-swing phase to a preset minimum value; and setting, by the processor, the initial value of the pitch angle at a beginning of a terminal swing phase to the minimum value, and setting the desired value at an ending of the terminal swing phase to zero.

4. The method according to claim 1, wherein calculating, by the processor, the ankle-foot position vector according to the support point comprises:

setting, by the processor, a component (ll) of the ankle-foot position vector on a preset first coordinate axis as a length of a front half of the foot when the pitch angle is greater than zero, with a toe of the foot serving as the support point;

setting, by the processor, the component (ll) of the ankle-foot position vector on the preset first coordinate axis to zero when the pitch angle is equal to zero, with a projection of the ankle on the support surface serving as the support point;

setting, by the processor, the component (ll) of the ankle-foot position vector on the preset first coordinate axis as a length of a rear half of the foot when the pitch angle is less than zero, with a heel of the foot serving as the support point; and setting, by the processor, a component (hh) of the ankle-foot position vector on a preset second coordinate axis as an ankle height of the biped robot.

5. The method according to claim 4, wherein calculating, by the processor, the magnitude of change of the ankle position according to the pitch angle and the ankle-foot position vector comprises:

calculating, by the processor, the magnitude of change of the ankle position according to a formula as follows:

$$d_{ankle}=(I-R)*(ll,hh)^T,$$

where $$I = \begin{bmatrix} 1 & 0 \\ 0 & 1 \end{bmatrix}, R = \begin{bmatrix} \cos\theta & \sin\theta \\ -\sin\theta & \cos\theta \end{bmatrix},$$

$\theta$ represents the pitch angle, $(ll, hh)^T$ represents the ankle-foot position vector, $d_{ankle}$ represents the magnitude of change of the ankle position.

6. The method according to claim 4, further comprising, after calculating, by the processor, the magnitude of change of the ankle position, determining, by the processor, a first magnitude of change corresponding to the magnitude of change of the ankle position when the pitch angle is equal to the maximum value, and determining a second magnitude of change corresponding to the magnitude of change of the ankle position when the pitch angle is equal to the maximum value; and obtaining, by the processor, a corrected magnitude of change of the ankle position by correcting the magnitude of change of the ankle position according to the first magnitude of change and the second magnitude of change in the mid-swing phase.

7. The method according to claim 1, wherein the compensated ankle position is calculated according to a formula as follows:

$$p\_ankle\_new=p\_ankle\_old+d_{ankle},$$

where p_ankle_old represents the ankle position, $d_{ankle}$ represents the magnitude of change of the ankle position, and p_ankle_new represents the compensated ankle position.

8. A non-transitory computer-readable storage medium storing one or more programs to be executed in a biped robot, the one or more programs, when being executed by one or more processors of the biped robot, causing the biped robot to perform processing comprising:

determining a pitch angle between a foot of the biped robot and a support surface where the biped robot stands;

determining a support point on a sole of the foot according to the pitch angle;

calculating an ankle-foot position vector according to the support point, wherein the ankle-foot position vector is a position vector from an ankle of the biped robot to the support point;

calculating a magnitude of change of an ankle position according to the pitch angle and the ankle-foot position vector; and obtaining a compensated ankle position by compensating the ankle position according to the magnitude of change of the ankle position, and controlling the biped robot to move according to the compensated ankle position.

9. The non-transitory computer-readable storage medium according to claim 8, wherein determining the pitch angle comprises:

dividing a gait cycle of the biped robot into a plurality of gait phases;

determining an initial value of the pitch angle at a beginning of each of the gait phases, and determining a desired value at an ending of each of the gait phases; and performing an interpolation processing according to the initial values and the desired values to obtain values of the pitch angle at each moment.

10. The non-transitory computer-readable storage medium according to claim 9, wherein determining the initial values and the desired values comprises:

setting the initial value of the pitch angle at a beginning of a pre-swing phase to zero, and setting the desired value at an ending of the pre-swing phase to a preset maximum value;

setting the initial value of the pitch angle at a beginning of a mid-swing phase to the maximum value, and setting the desired value at an ending of the mid-swing phase to a preset minimum value; and setting the initial value of the pitch angle at a beginning of a terminal swing phase to the minimum value, and setting the desired value at an ending of the terminal swing phase to zero.

11. The non-transitory computer-readable storage medium according to claim 8, wherein calculating the ankle-foot position vector according to the support point comprises:

setting a component (ll) of the ankle-foot position vector on a preset first coordinate axis as a length of a front half of the foot when the pitch angle is greater than zero, with a toe of the foot serving as the support point;

setting the component (ll) of the ankle-foot position vector on the preset first coordinate axis to zero when the pitch angle is equal to zero, with a projection of the ankle on the support surface serving as the support point;

setting the component (ll) of the ankle-foot position vector on the preset first coordinate axis as a length of a rear half of the foot when the pitch angle is less than zero, with a heel of the foot serving as the support point; and setting a component (hh) of the ankle-foot position vector on a preset second coordinate axis as an ankle height of the biped robot.

12. The non-transitory computer-readable storage medium according to claim 11, wherein calculating the magnitude of change of the ankle position according to the pitch angle and the ankle-foot position vector comprises:

calculating the magnitude of change of the ankle position according to a formula as follows:

$$d_{ankle}=(I-R)*(ll,hh)^T,$$

where $$I = \begin{bmatrix} 1 & 0 \\ 0 & 1 \end{bmatrix}, R = \begin{bmatrix} \cos\theta & \sin\theta \\ -\sin\theta & \cos\theta \end{bmatrix},$$

$\theta$ represents the pitch angle, $(ll, hh)^T$ represents the ankle-foot position vector, $d_{ankle}$ represents the magnitude of change of the ankle position.

13. The non-transitory computer-readable storage medium according to claim 11, further comprising, after calculating the magnitude of change of the ankle position, determining a first magnitude of change corresponding to the magnitude of change of the ankle position when the pitch angle is equal to the maximum value, and determining a second magnitude of change corresponding to the magnitude of change of the ankle position when the pitch angle is equal to the maximum value; and obtaining a corrected magnitude of change of the ankle position by correcting the magnitude of change of the ankle position according to the first magnitude of change and the second magnitude of change in the mid-swing phase.

14. The non-transitory computer-readable storage medium according to claim 8, wherein the compensated ankle position is calculated according to a formula as follows:

$$p\_ankle\_new=p\_ankle\_old+d_{ankle},$$

where p_ankle_old represents the ankle position, $d_{ankle}$ represents the magnitude of change of the ankle position, and p_ankle_new represents the compensated ankle position.

15. A biped robot comprising:

one or more processors;

a memory; and one or more programs, wherein the one or more programs are stored in the memory and configured to be executed by the one or more processors, the one or more programs comprises:

instructions for determining a pitch angle between a foot of the biped robot and a support surface where the biped robot stands;

instructions for determining a support point on a sole of the foot according to the pitch angle;

instructions for calculating an ankle-foot position vector according to the support point, wherein the ankle-foot position vector is a position vector from an ankle of the biped robot to a support point on a sole of the foot;

instructions for calculating a magnitude of change of an ankle position according to the pitch angle and the ankle-foot position vector; and instructions for obtaining a compensated ankle position by compensating the ankle position according to the magnitude of change of the ankle position, and controlling the biped robot to move according to the compensated ankle position.

16. The biped robot according to claim 15, wherein determining the pitch angle comprises:

dividing a gait cycle of the biped robot into a plurality of gait phases;

determining an initial value of the pitch angle at a beginning of each of the gait phases, and determining a desired value at an ending of each of the gait phases; and performing an interpolation processing according to the initial values and the desired values to obtain values of the pitch angle at each moment.

17. The biped robot according to claim 16, wherein determining the initial values and the desired values comprises:

setting the initial value of the pitch angle at a beginning of a pre-swing phase to zero, and setting the desired value at an ending of the pre-swing phase to a preset maximum value;

setting the initial value of the pitch angle at a beginning of a mid-swing phase to the maximum value, and setting the desired value at an ending of the mid-swing phase to a preset minimum value; and setting the initial value of the pitch angle at a beginning of a terminal swing phase to the minimum value, and setting the desired value at an ending of the terminal swing phase to zero.

18. The biped robot according to claim 15, wherein calculating the ankle-foot position vector according to the support point comprises:

setting a component (ll) of the ankle-foot position vector on a preset first coordinate axis as a length of a front half of the foot when the pitch angle is greater than zero, with a toe of the foot serving as the support point;

setting the component (ll) of the ankle-foot position vector on the preset first coordinate axis to zero when the pitch angle is equal to zero, with a projection of the ankle on the support surface serving as the support point;

setting the component (ll) of the ankle-foot position vector on the preset first coordinate axis as a length of a rear half of the foot when the pitch angle is less than zero, with a heel of the foot serving as the support point; and setting a component (hh) of the ankle-foot position vector on a preset second coordinate axis as an ankle height of the biped robot.

19. The biped robot according to claim 18, wherein calculating the magnitude of change of the ankle position according to the pitch angle and the ankle-foot position vector comprises:

calculating the magnitude of change of the ankle position according to a formula as follows:

$$d_{ankle}=(I-R)*(ll,hh)^T,$$

where $$I = \begin{bmatrix} 1 & 0 \\ 0 & 1 \end{bmatrix}, R = \begin{bmatrix} \cos\theta & \sin\theta \\ -\sin\theta & \cos\theta \end{bmatrix},$$

$\theta$ represents the pitch angle, $(ll, hh)^T$ represents the ankle-foot position vector, $d_{ankle}$ represents the magnitude of change of the ankle position.

20. The biped robot according to claim 18, further comprising, after calculating the magnitude of change of the ankle position, determining a first magnitude of change corresponding to the magnitude of change of the ankle position when the pitch angle is equal to the maximum value, and determining a second magnitude of change corresponding to the magnitude of change of the ankle position when the pitch angle is equal to the maximum value; and obtaining a corrected magnitude of change of the ankle position by correcting the magnitude of change of the ankle position according to the first magnitude of change and the second magnitude of change in the mid-swing phase.

* * * * *